United States Patent
Nishino

(10) Patent No.: US 9,448,077 B2
(45) Date of Patent: Sep. 20, 2016

(54) ROUTE SEARCH SYSTEM, ROUTE SEARCH METHOD, AND ROUTE SEARCH PROGRAM

(71) Applicant: Rakuten, Inc., Tokyo (JP)

(72) Inventor: Natsuki Nishino, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/404,056

(22) PCT Filed: Nov. 26, 2012

(86) PCT No.: PCT/JP2012/080467
§ 371 (c)(1),
(2) Date: Nov. 26, 2014

(87) PCT Pub. No.: WO2013/179513
PCT Pub. Date: Dec. 5, 2013

(65) Prior Publication Data
US 2015/0142307 A1 May 21, 2015

(30) Foreign Application Priority Data
May 30, 2012 (JP) ................................ 2012-123208

(51) Int. Cl.
*G01C 21/34* (2006.01)
(52) U.S. Cl.
CPC ........... *G01C 21/34* (2013.01); *G01C 21/3453* (2013.01)
(58) Field of Classification Search
CPC ........................... G01C 21/34; G01C 21/3453
USPC ....................................................... 701/465
See application file for complete search history.

(56) References Cited

U.S. PATENT DOCUMENTS

2012/0323485 A1* 12/2012 Mutoh ............... G01C 21/3617
701/428

FOREIGN PATENT DOCUMENTS

| JP | 10148539 A | 6/1998 |
| JP | 11201766 A | 7/1999 |
| JP | 2001296137 A | 10/2001 |
| JP | 200254940 A | 2/2002 |
| JP | 2003139553 A | 5/2003 |
| JP | 2007205947 A | 8/2007 |
| JP | 2008107179 A * | 5/2008 |

OTHER PUBLICATIONS

Machine Translation of JP 2008-107179 published May 2008.*
Machine Translation of JP 2003-139553 published May 2003.*
Jorudan Co., Ltd., "JorudanTrain Route Finder", [online], URL: http://www.jorudan.co.jp/english/norikae.
International Search Report dated Feb. 19, 2013 issued in Patent Application No. PCT/JP2012/080467.
English Translation of International Preliminary Report on Patentability dated Dec. 11, 2014 issued in Patent Application No. PCT/JP2012080467.

* cited by examiner

*Primary Examiner* — Anne M Antonucci
(74) *Attorney, Agent, or Firm* — Sughrue Mion, PLLC

(57) ABSTRACT

A route search system according to one embodiment includes a receiving unit, a first search unit, a determination unit, a second search unit, and an output unit. The receiving unit receives search criteria. The first search unit searches for a first route and time required based on the search criteria by referring to a storage unit that stores route information. The determination unit determines whether a difference between user's time and the time required is equal to or more than a specified value. When the difference is the specified value or more, the second search unit searches for a second route that takes a longer time than the first route. The output unit outputs the second route.

14 Claims, 15 Drawing Sheets

Fig. 3

| ROUTE ID | DEPARTURE POINT ID | ARRIVAL POINT ID | MEANS OF TRANSPORTATION | DEPARTURE TIME | ARRIVAL TIME | TIME REQUIRED | |
|---|---|---|---|---|---|---|---|
| E1 | N1 | N2 | TRAIN | 5:30 | 5:37 | 7 MINUTES | ... |
| | | | | ... | ... | ... | ... |
| E2 | N2 | N3 | TRAIN | 23:50 | 23:57 | 7 MINUTES | ... |
| | | | | ... | 5:40 | 3 MINUTES | ... |
| E3 | N1 | N3 | TRAIN | 5:45 | 5:50 | 5 MINUTES | ... |
| | | | | ... | ... | ... | ... |
| E4 | N1 | N3 | WALK | — | — | 20 MINUTES | ... |

Fig.4

| FACILITY ID | FACILITY NAME | POINT ID | AVERAGE STAY TIME | BUSINESS HOURS | SEASONAL FACTOR | TEMPORAL FACTOR | ... |
|---|---|---|---|---|---|---|---|
| F1 | PARK A | N1 | 15 MINUTES | — | CHERRY BLOSSOMS BLOOM IN SPRING | DANGEROUS AFTER 11PM | ... |
| F2 | PARK B | N2 | 60 MINUTES | 8:00 ~ 20:00 | — | CROWDED IN HOLIDAYS | ... |

Fig. 5

| STORE ID | STORE GENRE ID | STORE NAME | LATITUDE | LONGITUDE | ... |
|---|---|---|---|---|---|
| S1 | J1 | COFFEE SHOP A | x1 | y1 | ... |
| S2 | J2 | CHINESE RESTAURANT B | x2 | y2 | ... |
| ... | ... | ... | ... | ... | ... |

Fig. 6

| STORE GENRE ID | STORE GENRE NAME | STAY TIME | ESTIMATED CALORIE INTAKE (kcal) | ... |
|---|---|---|---|---|
| J1 | COFFEE SHOP | 1 HOUR | 300 | ... |
| J2 | CHINESE RESTAURANT | 1 HOUR | 600 | ... |
| ... | ... | ... | ... | ... |

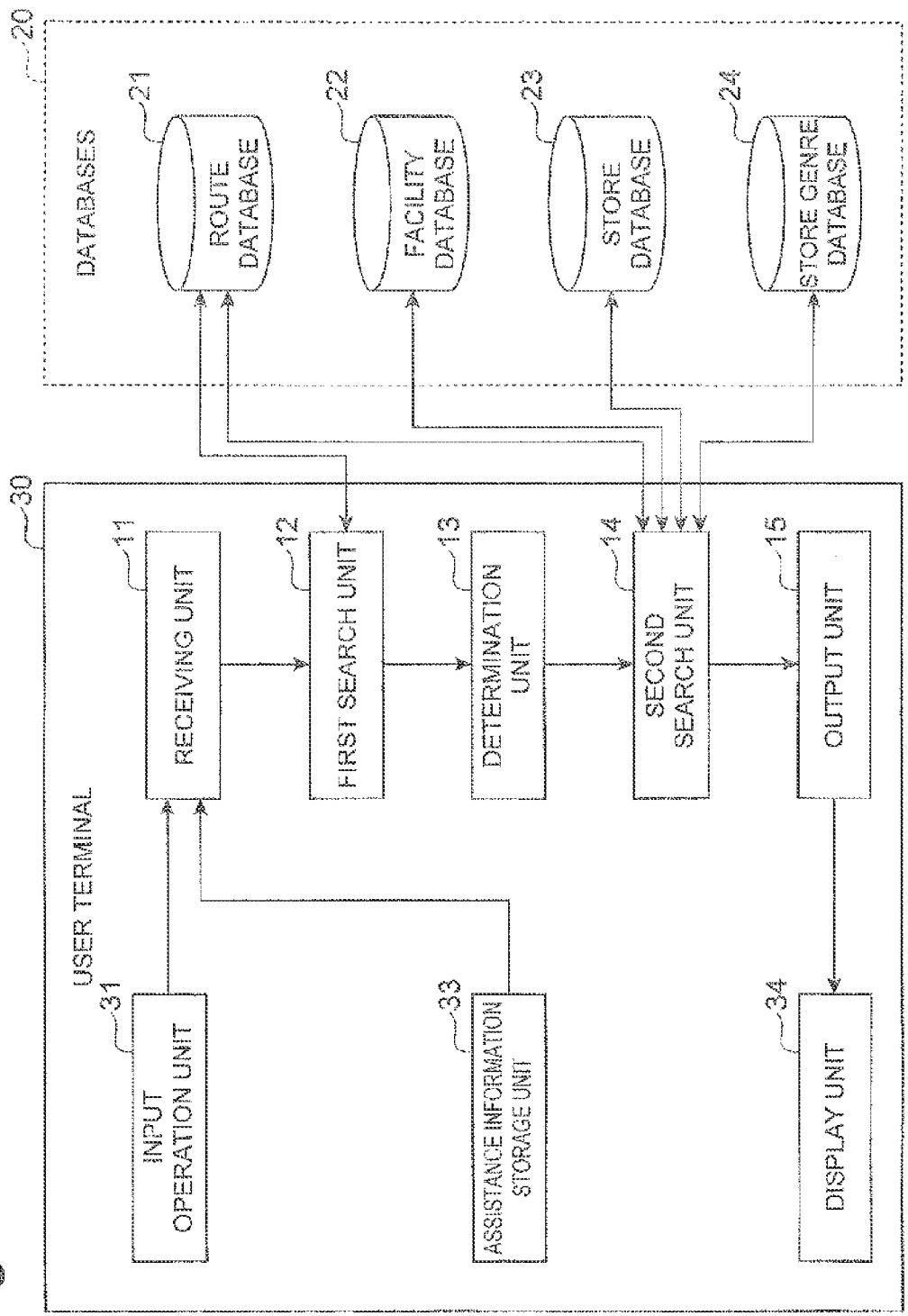

ROUTE SEARCH SYSTEM, ROUTE SEARCH METHOD, AND ROUTE SEARCH PROGRAM

CROSS REFERENCE TO RELATED APPLICATIONS

This application is a National Stage of International Application No. PCT/JP2012/080467 filed Nov. 26, 2012, claiming priority based on Japanese Patent Application No. 2012-123208 filed May 30, 2012, the contents of all of which are incorporated herein by reference in their entirety.

TECHNICAL FIELD

One embodiment of the present invention relates to a route search system, a route search method, and a route search program.

BACKGROUND ART

Techniques to present a route from the place of departure to the place of destination and time required for the route to a user have been known. For example, a website taught by Non-Patent Literature 1 below is to perform route search based on the place of departure, the place of destination, time criteria (specification of any one of the time of departure, the time of arrival, the first train and the last train), and other criteria (specification of a via point, a means of transportation etc.) indicated by a user, and present a route that satisfies those criteria to a user.

CITATION LIST

Patent Literature

NPL1: Jorudan Co., Ltd. "Jorudan Train Route Finder", [online], Internet <URL:http://www.jorudan.co.jp/norikae/>

SUMMARY OF INVENTION

Technical Problem

In the existing frameworks such as the website taught by the above-described Non-Patent Literature 1, although it is possible to find a route with less travel burden (for example, a route with the shortest time required, a route with the cheapest fare, a route with the fewest transfers etc.), it is not possible to find a route that allows the best use of a user's time until the time of arrival. There is thus a demand for a framework that allows a user having extra time to make the best use of the time.

Solution to Problem

A route search system according to one aspect of the present invention includes a receiving unit configured to receive search criteria including a planned departure time, a target arrival time, a place of departure and a place of destination, a first search unit configured to search for a first route from the place of departure to the place of destination and time required for the first route based on the search criteria by referring to a storage unit configured to store route information, a determination unit configured to determine whether a difference between time from the planned departure time to the target arrival time and the time required is equal to or more than a specified value, a second search unit configured to, when the difference is equal to or more than the specified value, calculate a difference between a departure time of a candidate route and the planned departure time and calculate a difference between an arrival time of the candidate route and the target arrival time by referring to the storage unit, determine whether the candidate route satisfies route requirements that depart from the place of departure within a specified time from the planned departure time and arrive at the place of destination at some time from a specified time before the target arrival time to the target arrival time by taking a longer time than the first route based on the two differences, and thereby search for a second route that satisfies the route requirements, and an output unit configured to output the second route as a search result for the search criteria.

A route search method according to one aspect of the present invention is a route search method performed by a route search system, including a receiving step of receiving search criteria including a planned departure time, a target arrival time, a place of departure and a place of destination, a first search step of searching for a first route from the place of departure to the place of destination and time required for the first route based on the search criteria by referring to a storage unit that stores route information, a determination step of determining whether a difference between time from the planned departure time to the target arrival time and the time required is equal to or more than a specified value, a second search step of, when the difference is equal to or more than the specified value, calculating a difference between a departure time of a candidate route and the planned departure time and calculate a difference between an arrival time of the candidate route and the target arrival time by referring to the storage unit, determining whether the candidate route satisfies route requirements that depart from the place of departure within a specified time from the planned departure time and arrive at the place of destination at some time from a specified time before the target arrival time to the target arrival time by taking a longer time than the first route based on the two differences, and thereby searching for a second route that satisfies the route requirements, and an output step of outputting the second route as a search result for the search criteria.

A route search program according to one aspect of the present invention causes a computer to implement a receiving unit configured to receive search criteria including a planned departure time, a target arrival time, a place of departure and a place of destination, a first search unit configured to search for a first route from the place of departure to the place of destination and time required for the first route based on the search criteria by referring to a storage unit configured to store route information, a determination unit configured to determine whether a difference between time from the planned departure time to the target arrival time and the time required is equal to or more than a specified value, a second search unit configured to, when the difference is equal to or more than the specified value, calculate a difference between a departure time of a candidate route and the planned departure time and calculate a difference between an arrival time of the candidate route and the target arrival time by referring to the storage unit, determine whether the candidate route satisfies route requirements that depart from the place of departure within a specified time from the planned departure time and arrive at the place of destination at some time from a specified time before the target arrival time to the target arrival time by taking a longer time than the first route based on the two differences, and thereby search for a second route that satisfies the route requirements, and an output unit configured to output the second route as a search result for the search criteria.

According to the above-described aspects, when a difference between time from the departure time to the arrival time indicated by search criteria and time required for a route obtained by the first route search based on the search criteria is equal to or more than a specified value, which is when there is extra time in the user's time, a route that fills the time is searched for. To be specific, in order to find a route (second route) that takes a longer time than a first route and that departs at the time that is as close as possible to the planned departure time and arrives at the time that is as close as possible to the target arrival time, the second search is performed based on both of the departure time to the arrival time. Then, the second route that is found as a result of the search is presented to a user. By such two-step search, it is possible to present a user having extra time a route to make the best use of the time.

In the route search system according to another aspect, the storage unit may further store availability information indicating an available period or an available time zone of a route or a facility, and the second search unit may select a candidate route that satisfies the route requirements and goes through the route or the facility during the available period or the available time zone as the second route. It is thereby possible to prevent that a route that is actually not available is presented as the second route to a user, and it is thereby expected to enhance the convenience of the route search system.

In the route search system according to another aspect, the storage unit may further store evaluation information indicating an evaluation of a route or a facility based on a timing factor, and the second search unit may determine an evaluation value of a candidate route based on the evaluation information of a route or a facility included in the candidate route, and selects a candidate route that has a higher evaluation value than other candidate routes as the second route. It is thereby possible to present a user the route with a high evaluation value, which is a route that is expected to give a user a higher level of satisfaction by using the route, as the second route, and it is thereby expected to enhance the satisfaction level of the user.

In the route search system according to another aspect, the receiving unit may acquire position information of a user after the output unit outputs the second route, and specifies new search criteria including the planned departure time and the place of departure obtained from the position information, and a new second route may be output by the first search unit, the determination unit, the second search unit and the output unit based on the new search criteria. Thus, even if the second route presented once to a user becomes inappropriate later on, it is possible to present the user the second route based on the search criteria specified by the latest information, and it is thereby expected to enhance the satisfaction level of the user.

In the route search system according to another aspect, the second search unit may select the new second route among routes that go through a different via point from the second route previously output from the output unit. Thus, when a user does not travel along the second route presented first, it is possible to present the user the route including another via spot as the second route, and it is thereby expected to enhance the satisfaction level of the user.

In the route search system according to another aspect, the second search unit may select the new second route among routes that travel by a different means of transportation from the second route previously output from the output unit. Thus, when a user does not travel along the second route presented first, it is possible to present the user the route by another means of transportation as the second route, and it is thereby expected to enhance the satisfaction level of the user.

In the route search system according to another aspect, the receiving unit may receive the search criteria further including target calorie consumption, and the second search unit may acquire expected calorie consumption for a case where the user uses a candidate route, and selects the candidate route that satisfies the route requirements and where the expected calorie consumption is equal to or more than the target calorie consumption as the second route. Thus, when there is extra time in user's time, it is possible to present the user the route that allows consumption of calories during traveling as the second route, and it is thereby expected to enhance the satisfaction level of the user who desires to consume calories by using the extra time.

In the route search system according to another aspect, when the candidate route where the expected calorie consumption is equal to or more than the target calorie consumption does not exist, the second search unit may select the candidate route that satisfies the route requirements and where the expected calorie consumption is highest as the second route. It is thereby possible to present a user the route to consume as many calories as possible, though not to consume the target calories, as the second route, and it is thereby expected to enhance the satisfaction level of the user who desires to consume calories by using the extra time.

In the route search system according to another aspect, the second search unit may acquire position information of a user after the output unit outputs the second route, estimate a via point and a stay time at the via point of the user based on the position information, calculate calorie intake of the user at the via point based on a result of the estimation, update the target calorie consumption based on the calorie intake, and search for the new second route based on the search criteria including the updated target calorie consumption. It is thereby possible to modify the target calorie consumption in consideration of the amount of calories estimated to be taken by a user during traveling and present the user the route to achieve the modified target calorie consumption as the second route again. This eliminates the need for the user to enter the target calorie consumption again when the user eats some calories during traveling, and it is thereby expected to enhance the satisfaction level of the user.

Advantageous Effects of Invention

According to one aspect of the present invention, it is possible to present a user having extra time a route to make the best use of the time.

BRIEF DESCRIPTION OF DRAWINGS

FIG. 3 is a diagram showing an example of route information.

FIG. 4 is a diagram showing an example of facility information.

FIG. 5 is a diagram showing an example of store information.

FIG. 6 is a diagram showing an example of store genre information.

FIG. 15 is a block diagram showing a functional configuration of a route search system according to an alternative example.

DESCRIPTION OF EMBODIMENTS

Embodiments of the present invention will be described hereinafter in detail with reference to the appended drawings. Note that, in the description of the drawings, the same or equivalent elements are denoted by the same reference symbols, and the redundant explanation thereof is omitted.

Figure 1:
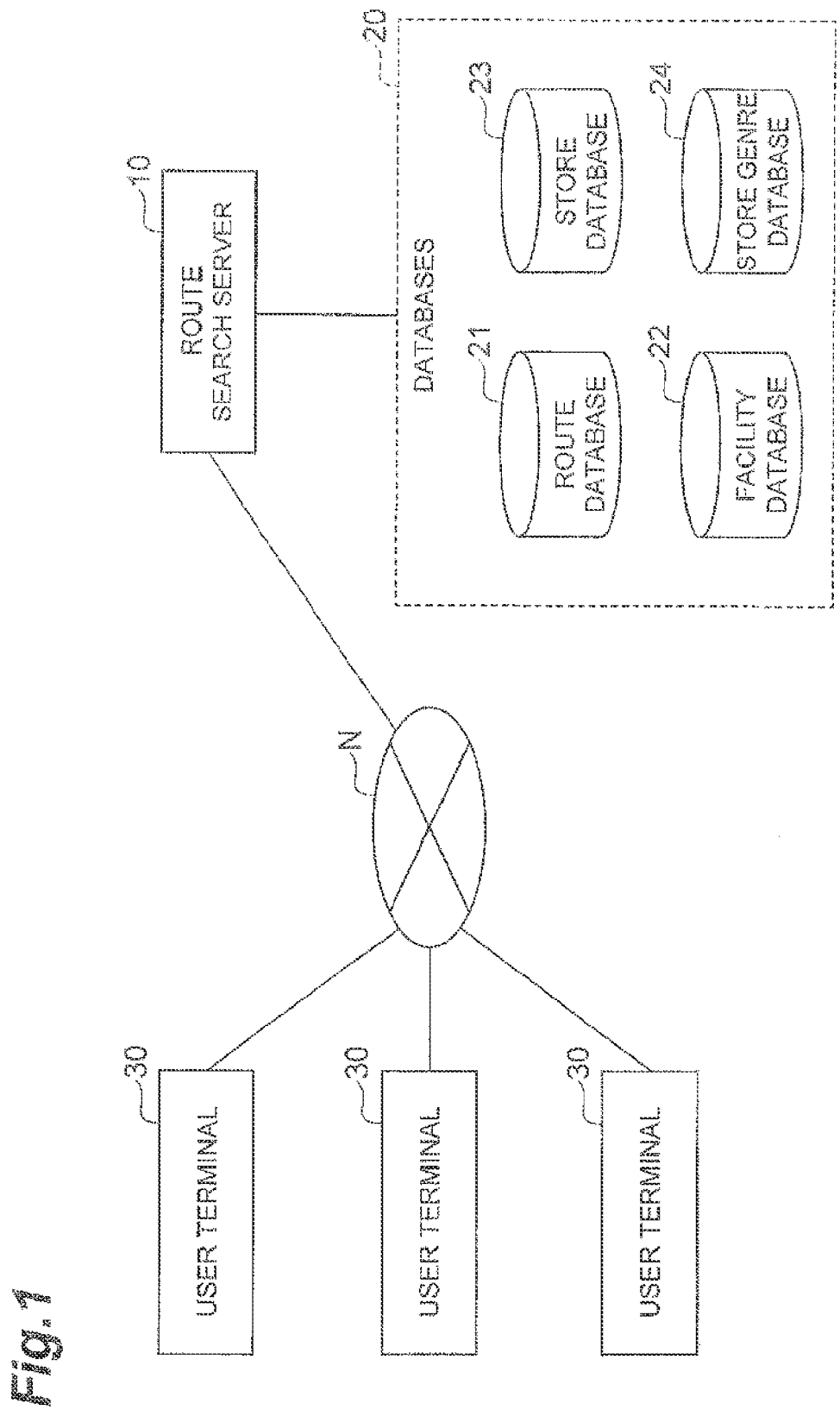
FIG. 1 is a diagram showing an overall configuration of a route search system according to this embodiment.

First, an overall configuration of a route search system 1 according to this embodiment is described with reference to FIG. 1. The route search system 1 includes a route search server 10, databases (storage unit) 20, and user terminals 30. Those devices are connected with one another through a communication network N. A user causes the route search server 10 to perform route search processing through the user terminal 30 and thereby acquires information about a route that allows the best use of the user's time.

The route search server 10 is a computer system that performs route search processing in response to a search request from a user.

The databases 20 are a set of several types of databases that are required in the route search system 1. In this embodiment, each of the databases 20 is configured as a separate component from the route search server 10 as shown in FIG. 1 and connected to the route search server 10 through a dedicated network such as SAN (Storage Area Network). Note that, however, the configuration of the databases 20 is not limited thereto. For example, each of the databases 20 may be NAS (Network Attached Storage) connected to the communication network N or may be DAS (Direct Attached Storage) directly connected to the route search server 10 by the SCSI interface. Further, each database may be built in the route search server 10.

The user terminal 30 is a computer that is owned by a user (general user). Although the user terminal 30 may be a stationary personal computer, a portable terminal which a user can use as moving is mainly assumed in this embodiment. To be specific, the user terminal 30 is a portable terminal such as an advanced mobile phone (smart phone), a mobile phone or a personal digital assistant (PDA), for example. The type of the user terminal 30, however, is not limited thereto. The number of user terminals 30 in the route search system 1 is also not particularly limited.

Based on the above assumption, the route search server 10 is described in detail hereinbelow. First, the databases which the route search server 10 refers to for route search are described in detail.

A route database 21 is a device that stores route information. The content and format of the route information are determined from the viewpoints of the specific implementation method, processing efficiency and the like of route search processing performed by the route search server 10. In this embodiment, the route information includes a route ID that identifies a route, a departure point ID, an arrival point ID, a means of transportation, a departure time, an arrival time, and time required for each route between adjacent points. The departure time and the arrival time are availability information indicating a time period or a time zone where the route is available.

Figure 2:
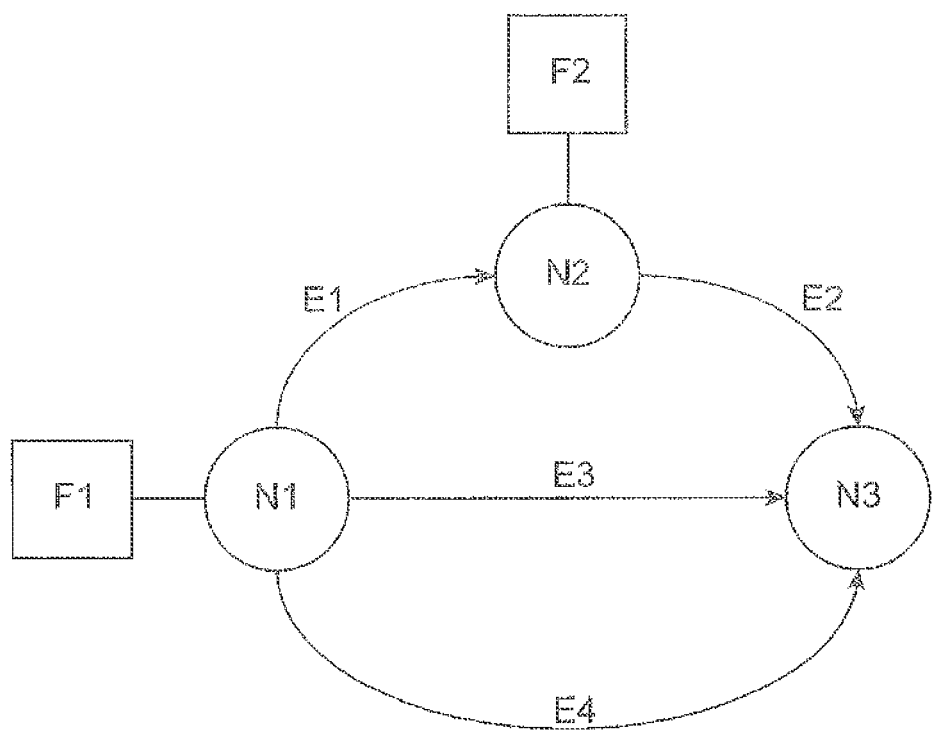
FIG. 2 is a diagram showing an example of a route according to this embodiment.

An example of routes that are used in this embodiment is described with reference to FIG. 2. In FIG. 2, routes between points and facilities located in each point are schematically shown. N1 to N3 indicate points that serve as reference points for route search, such as bus stops, stations, airports, ports and intersections. E1 to E4 indicate routes between adjacent points, such as lines (buses, trains, airplanes, ships etc.) and roads. F1 and F2 indicate facilities located at the point N1 and the point N2, respectively.

FIG. 3 shows an example of route information corresponding to the example of routes in FIG. 2. In this example, the routes E1 to E3 are train routes, and the route E4 is a road to travel on foot. The departure time, the arrival time and the time required of trains are associated with the routes E1 to E3 to travel by train. Those information are stored for each departure time from the first train to the last train. On the other hand, because there is no fixed time for the route E4 to travel on foot, the fields of the departure time and the arrival time are blank.

The facility database 22 is a device that stores facility information. The content and format of the facility information are determined from the viewpoints of the specific implementation method, processing efficiency and the like of route search processing performed by the route search server 10. In this embodiment, the facility information includes a facility ID that identifies a facility, a facility name, a point ID of a point where a facility is located, and other facility related information (average stay time, business hours, seasonal factor, temporal factor etc.). The business hours are availability information indicating a time period or a time zone where the facility is available, and the seasonal factor and the temporal factor are evaluation information indicating evaluations of the facility based on timing factors.

FIG. 4 shows an example of facility information corresponding to the example of routes shown in FIG. 2. In this example, both of the facility F1 and the facility F2 are parks, which are located at the point N1 and the point N2, respectively. This example tells that the facility F1 takes about 15 minutes to walk around, opens at all times (the field of the business hours is blank), and is dangerous after 11 pm, and cherry blossoms bloom there in spring.

The store database 23 is a device that stores store information. The content and format of the store information are determined from the viewpoints of the specific implementation method, processing efficiency and the like of route search processing performed by the route search server 10. In this embodiment, the store information includes a store ID that identifies a store, a store genre ID that identifies a store genre, a store name, and store position information (latitude and longitude). FIG. 5 shows an example of store information.

The store genre database 24 is a device that stores store genre information. The content and format of the store genre information are determined from the viewpoints of the specific implementation method, processing efficiency and the like of route search processing performed by the route search server 10. In this embodiment, the store genre information includes a store genre ID that identifies a store genre, a store genre name, a stay time, and estimated calorie intake. FIG. 6 shows an example of store genre information.

Note that the structures of the respective databases are not limited to those shown in FIGS. 3 to 6, and the databases may be normalized or made redundant by an arbitrary policy.

Figure 7:
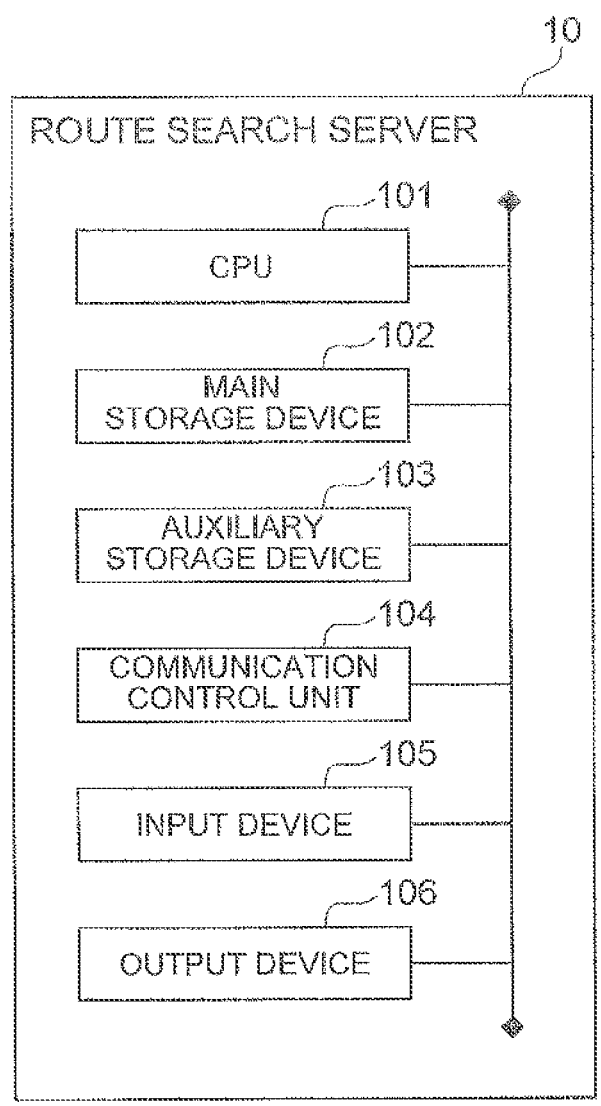
FIG. 7 is a diagram showing a hardware configuration of a route search server according to this embodiment.

The functions and configuration of the route search server 10 are described hereinafter. FIG. 7 shows a hardware configuration of the route search server 10. As shown therein, the route search server 10 includes a CPU 101 that executes an operating system, an application program and the like, a main storage unit 102 such as ROM and RAM, an auxiliary storage unit 103 such as a hard disk, a communication control unit 104 such as a network card, an input device 105 such as a keyboard and a mouse, and an output device 106 such as a display. Note that, however, it is not necessary to include the input device 105 and the output device 106 when there is no need to directly operate the route search server 10, when setting of a server, update of software and the like are performed by remote control and the like.

The functional elements of the route search server 10, which are described later, are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103. Note that, although the route search server 10 is composed of one computer in the example of FIG. 7, the functions of the route search server 10 may be distributed among a plurality of computers.

The user terminal 30 has the same hardware configuration as the route search server 10 and therefore the illustration of the hardware configuration of the user terminal 30 is omitted. Note that, however, specific parts can be different between the user terminal 30 and the route search server 10, and the input device and the output device are implemented by a touch panel in the user terminal 30, for example. In the user terminal 30, like the route search server 10, the below-described functional elements are implemented using hardware.

An overview of route search processing performed by the route search system 1 according to this embodiment is described hereinafter. The route search system 1 performs route search in response to a search request from a user and presents a route that allows the best use of the user's time (which is referred to hereinafter as "initial search"). The route search system 1 may search and present a route again after presenting a route to the user once by initial search, by receiving position information and position information acquisition time of the user terminal 30 as appropriate from the user terminal 30 (which is referred to hereinafter as "automatic re-search"). The route presented to the user by the initial search can become an unavailable route or an inappropriate route later on when a user does not travel along the presented route or when an unexpected situation such as train delay occurs on the route. With the automatic re-search, it is possible to present an appropriate route again to the user and enhance the convenience of the user.

Figure 8:
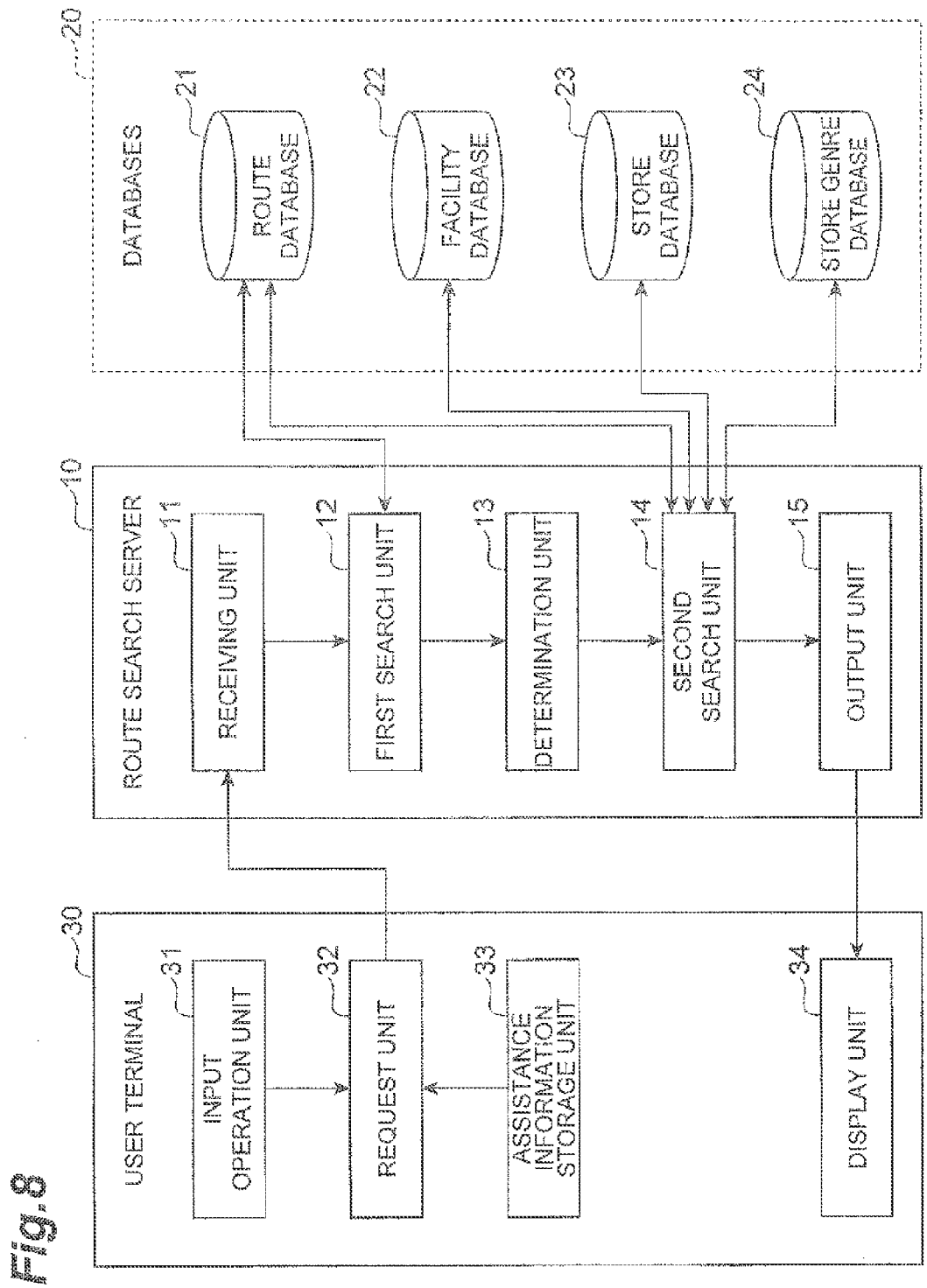
FIG. 8 is a block diagram showing a functional configuration of a route search system according to this embodiment.

The functional elements of the route search system 1 according to this embodiment are described hereinafter with reference to FIG. 8.

First, the functional elements of the user terminal 30 are described. The user terminal 30 includes an input operation unit 31, a request unit 32, an assistance information storage unit 33, and a display unit 34. The input operation unit 31 is a functional element that receives an input operation from a user. The request unit 32 is a functional element that receives input search criteria and transmits them to the route search server 10. The assistance information storage unit 33 is a functional element that stores information that assists the input of search criteria. The display unit 34 is a functional element that displays a search result screen.

The request unit 32 generates search criteria based on information input by a user through the input operation unit 31 or assistance information stored in the assistance information storage unit 33. The search criteria at least include the planned departure time, the target arrival time, the place of departure and the place of destination, and may further include target calorie consumption. The request unit 32 transmits the generated search criteria to the route search server 10. After that, the display unit 34 displays the route information presented by the route search server 10 as a search result. The assistance information stored in the assistance information storage unit 33 includes schedule information registered in advance by a user, system time information, and position information acquired by GPS. The request unit 32 can obtain the target arrival time and the place of destination from the schedule information, obtain the current time (planned departure time) from the system time information, and obtain the current place (place of departure) from the position information.

When the route search server 10 performs the automatic re-search, the request unit 32 transmits the position information and the position information acquisition time of the user terminal 30 to the route search server 10 at regular intervals or by a user's explicit operation.

Next, the functional elements of the route search server 10 are described. The route search server 10 includes a receiving unit 11, a first search unit 12, a determination unit 13, a second search unit 14, and an output unit 15.

The receiving unit 11 is a functional element that receives search criteria. The receiving unit 11 receives the search criteria from the request unit 32 of the user terminal 30 and temporarily stores the search criteria and passes them to the first search unit 12. The temporarily stored search criteria are referred to at the time of automatic re-search. Specifically, at the time of automatic re-search, the receiving unit 11 specifies new search criteria based on the position information and the position information acquisition time of the user terminal 30 received from the request unit 32 and the temporarily stored search criteria, and passes the new search criteria to the first search unit 12.

Note that, although the request unit 32 generates all of the search criteria for the initial search in this embodiment, the route search server 10 may complement the input of the search criteria. To be specific, the route search server 10 may use the system time that is held by the route search server 10 as the planned departure time (current time) of the search criteria or may set the target arrival time and the place of destination of the search criteria based on the user's schedule information registered in the route search server 10 or another external server (not shown). This reduces the amount of search criteria to be entered by a user, and it is thereby possible to save a user the trouble of entering the criteria.

The first search unit 12 is a functional element that searches for a route (first route) from the place of departure to the place of destination and time required for the route based on the search criteria acquired from the receiving unit 11. The first search unit 12 acquires the first route and time required for the route that satisfy the search criteria by referring to the route database 21. After that, the first search unit 12 passes the acquired route information to the determination unit 13. In this embodiment, it is assumed that the first route is a route with the shortest time required (shortest route). Note that, however, the first route is not limited thereto, and it may be a route with the cheapest fare (cheapest route), a route with the easiest transfers (the easiest route), a route with the highest evaluation value of those indexes or the like. Further, the first route may be a plurality of routes, such as several routes in higher ranks when evaluated by the same index or routes in higher ranks of the respective evaluations. When there are a plurality of candidates for the first route, the first search unit 12 passes each of the candidate routes as the first route to the determination unit 13.

A route search algorithm that is used by the first search unit 12 to search for the first route is not particularly limited. To be specific, a route search algorithm which is the improvement of the shortest route algorithm such as the Dijkstra's algorithm is used, for example.

The first route is described hereinafter using the examples shown in FIGS. 2 and 3. When the place of departure and the place of destination of the search criteria are the point N1 and the point N3, respectively, there are three possible routes: route 1 (route E1 and route E2), route 2 (route E3) and route 3 (route E4). Assuming that the train wait time is negligible for any of the routes E1 to E3, the time required for the route 1 is 10 minutes (7 minutes+3 minutes), the time required for the route 2 is 5 minutes, and the time required for the route 3 is 20 minutes. Thus, in this case, the route 2, which is the shortest route, is selected as the first route, and the first search unit 12 passes the route 2 and the time required for the route 2 (5 minutes) to the determination unit 13.

The determination unit 13 is a functional element that determines whether a difference between the time from the planned departure time to the target arrival time (which is referred to hereinafter as "user's time") and the time required for the first route acquired from the first search unit 12 is equal to or more than a specified value k. The specified value k may be a fixed value such as k=20 or a value calculated by a calculation formula such as k=user's time× 0.5. The determination unit 13 passes the determination result to the second search unit 14.

When the time from the planned departure time to the target arrival time is T1 and the time required for the first route is T2, the determination unit 13 calculates a difference between those two times: $\Delta t = T1 - T2$. Then, the determination unit 13 determines whether the difference $\Delta t$ is equal to or more than the specified value k.

An example of the determination method is described with reference to FIGS. 2 and 3. It is assumed that the planned departure time is 8:00 am and the target arrival time is 8:20 am. As described earlier, because the route 2 (E3), which is the shortest route, is the first route, T1=20 and T2=5, and $\Delta t = T1 - T2 = 15$. In the case where the specified value k is defined as k=20, because $\Delta t$ is not equal to or more than the specified value k, the determination unit 13 determines that the difference is not equal to or more than the specified value. On the other hand, in the case where the specified value k is defined as k=T1×0.5, k=10, and because $\Delta t$ is equal to or more than the specified value k, the determination unit 13 determines that the difference is equal to or more than the specified value.

The second search unit 14 is a functional element that searches for a route (second route) that allows a user to make the best use of the time when a difference between the user's time and the time required for the first route is equal to or more than the specified value, which is when there is extra time in the user's time. In the case where the determination result of the determination unit 13 is "the difference is equal to or more than the specified value", the second search unit 14 searches for a second route that satisfies route requirements that depart from the place of departure within a specified time k1 from the departure time and arrive at the place of destination at some time from a specified time k2 before the target arrival time to the target arrival time, taking a longer time than the first route. To be specific, the second search unit 14 refers to the route database 21 and the facility database 22 and acquires the second route that satisfies the search criteria and the route requirements. On the other hand, in the case where the determination result of the determination unit 13 is "the difference is not equal to or more than the specified value", the second search unit 14 passes the first route as the final search result to the output unit 15 without searching for the second route.

The above-described k1 and k2 are set to the shorter time than the user's time in order to make the best use of the user's time. For example, k1 and k2 may be values where the user's travel time (from the departure time to the arrival time) fills at least 70% of the user's time, or fills 80% of the user's time in order to find the route that makes the better use of the user's time. Note that, however, the values of k1 and k2 are not limited thereto.

When the second search unit 14 acquires one or more second routes as a result of search, it passes the second routes to the output unit 15. There may be a plurality of second routes, and, in this case, the second search unit 14 passes the plurality of second routes to the output unit 15. On the other hand, when there is no candidate for the second route (including the case where the second search unit 14 does not search for the second route), the second search unit 14 may pass the first route to the output unit 15.

The second search unit 14 determines the route that satisfies the route requirements as the second route among candidate routes such as a circuitous route, a route using a slow means of transportation and a route that stops by some facility. The second search unit 14 may determine the second route based on the business hours, the temporal factor and the like contained in the facility information. Specifically, the search unit 14 may make determination about the appropriateness of use of each of the routes extracted as candidates and exclude an unavailable route and a route that is not appropriate for use (dangerous route, crowded route etc.).

Further, the second search unit 14 may determine the second route based on the evaluation value of each of the candidate routes determined from the evaluation information of the route or the facility. The second search unit 14 compares the user's time with the timing factor (seasonal factor or temporal factor) of the facility indicated by the facility information and determines the evaluation value of the route that goes through the facility during the time or period indicated by the timing factor. For example, the second search unit 14 increases the evaluation value to be more than usual for the candidate route that goes through the park A during the period indicated by the seasonal factor "cherry blossoms bloom in spring" in FIG. 4. On the other hand, the second search unit 14 reduces the evaluation value to be less than usual for the candidate route that goes through the park A during the time indicated by the temporal factor "dangerous after 11 pm" and the candidate route that goes through the park B during the period indicated by the temporal factor "crowded in holidays" in FIG. 4.

Then, the second search unit 14 preferentially selects the candidate route where the calculated evaluation value is high. To be specific, the second search unit 14 selects an arbitrary number of candidate routes in the descending order of the evaluation values as the second routes. Note that the route information may contain evaluation information and, in this case, the second search unit 14 can determine the second route by taking the evaluation value of the route, just like the evaluation value of the facility, into consideration.

In the case where target calorie consumption is included in the search criteria, the second search unit 14 searches for a route by using not only the route requirements but also the requirements that "the target calorie consumption is achieved". When the route that satisfies the requirements about the target calorie consumption is not found, the second search unit 14 may determine the route where the expected calorie consumption is as high as possible as the second route. It is thereby possible to present a user the route to consume as many calories as possible, though not to consume the target calories, and thereby enhance the satisfaction level of the user.

The search by the second search unit 14 and the second route are specifically described hereinafter using the example of routes in FIGS. 2 and 3. It is assumed that the specified value k is defined as $k=T1\times 0.5$. In this case, because the determination unit 13 determines that the difference is equal to or more than the specified value as described above, the second search unit 14 search for the second route.

The second route is described with reference to FIG. 9. It is assumed that the specified values k1 and k2 are defined as fixed values (5 minutes). Further, the expected calorie consumption is 30 kcal by walking for 10 minutes, and 3 kcal by train for 10 minutes. Further, for convenience of description, the time required for the first route and the second route is L1 and L2, respectively, and a difference between the planned departure time and the departure time of each route is $\Delta t1$, and a difference between the arrival time of each route and the target arrival time is $\Delta t2$. Based on such assumptions, the route requirements to be satisfied by the second route are "$\Delta t1 \leq k1$ and $\Delta t2 \leq k2$ and $L1<L2$". Further, when the search criteria include target calorie consumption, the second route needs to satisfy "calorie consumption when using the route $\geq$ target calorie consumption" (which is referred to hereinafter as "calorie consumption requirements") in addition to the route requirements.

The route requirements are described first. The first route is the route that departs from the point N1 at 8:00 am and arrives at the point N3 at 8:05 am through the route E3. Thus, "$\Delta t1(=0) \leq k1(=5)$, $\Delta t2(=15) > k2(=5)$, $L1(=5)=L2(=5)$", and the first route in this example does not satisfy the route requirements.

Figure 9:
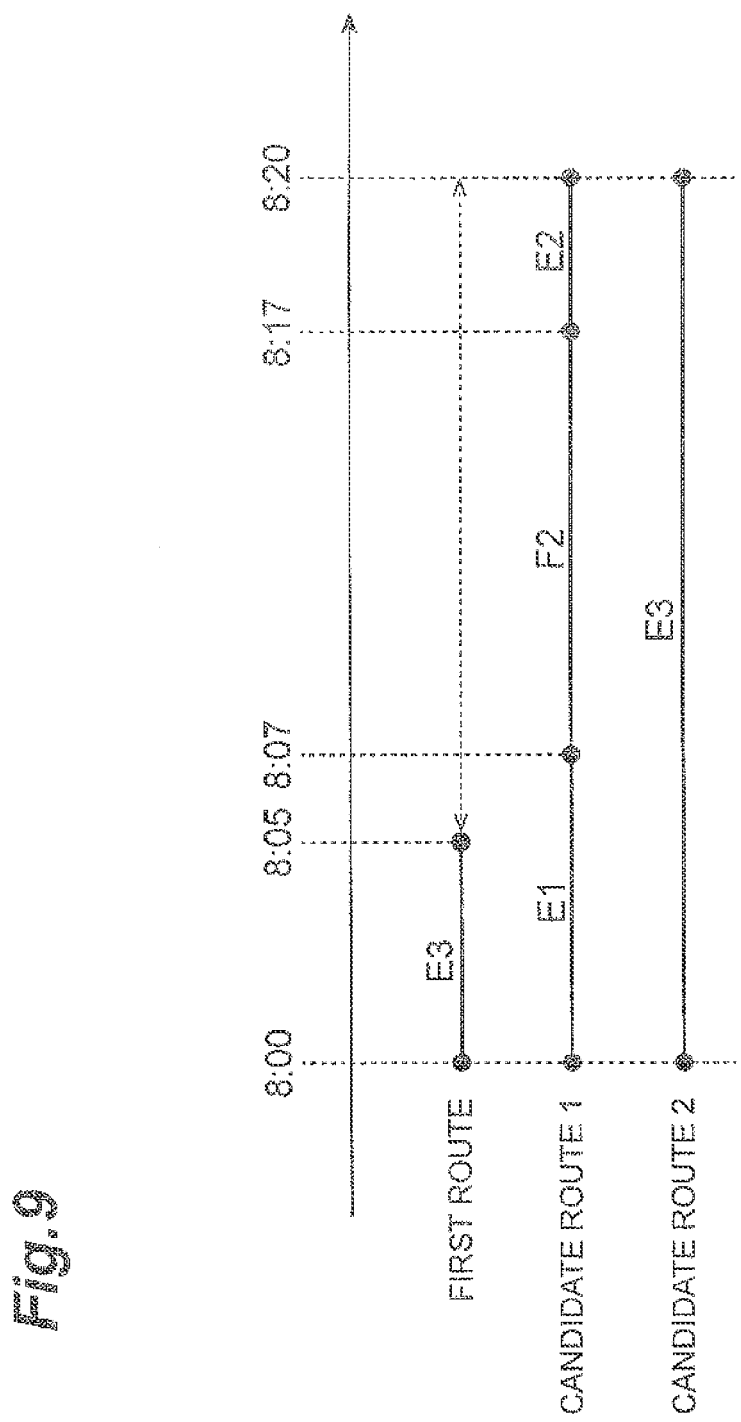
FIG. 9 is a time-series diagram showing an example of a second route.

The candidates for the second route are the candidate route 1 (the route that departs from the point N1 at 8:00 am and arrives at the point N2 at 8:07 am through the route E1, stops by the facility F2 from 8:07 am to 8:17 am and then departs from the point N2 at 8:17 am and arrives at the point N3 at 8:20 am through the route E2) and the candidate route 2 (the route that departs from the point N1 at 8:00 am and arrives at the point N3 at 8:20 am through the route E3) as shown in FIG. 9. Because both of the candidate route 1 and the candidate route 2 satisfy the route requirements, when the search criteria do not include the target calorie consumption, the second search unit 14 selects both of the candidate route 1 and the candidate route 2 as the second routes.

The processing in the case of taking the calorie consumption requirements into consideration is described hereinafter. It is assumed that the target calorie consumption is included in the search criteria, and the target calories to be consumed are 50 kcal. When using the candidate route 1, the user can consume 3 kcal by taking a train for 10 minutes in total through the route E1 and the route E2, and consume 30 kcal by stopping by the facility F2 for 10 minutes, and thus can consume 33 kcal in total. On the other hand, when using the candidate route 2, the user can consume 60 kcal by walking through the route E3 for 20 minutes. Accordingly, while the candidate route 1 does not satisfy the calorie consumption requirements, the candidate route 2 satisfies the calorie consumption requirements. Thus, the second search unit 14 selects only the candidate route 2 as the second route.

Note that, although calorie consumption per unit workout (10-minute walking) is assumed to be 30 kcal in the above example, the amount of calories consumed actually varies from individual to individual depending on gender, body weight and the like. Thus, the route search server 10 may have a database (not shown) that stores calorie settings such as calorie consumption for each gender, body weight or per unit workout of each user, and the second search unit 14 may calculate calorie consumption by referring to the database. The second search unit 14 can thereby calculate calorie consumption in accordance with each user. Note that, however, the way of storing and using calorie settings is not limited thereto. For example, the user terminal 30 may store calorie settings, and the user terminal 30 may transmit the calorie settings to the route search server 10 at the same time as sending a search request. Further, calorie settings may have default settings, and a user may customize the settings.

The second search unit 14 may estimate a via point and a stay time of a user, estimate the amount of calories taken by the user during stay (estimated calorie intake), and automatically update the target calorie consumption by a difference between the estimated calorie intake and the amount of calories already consumed by the user in the automatic re-search in the case where the search criteria include target calorie consumption.

First, the second search unit 14 estimates the via point and the stay time of the user based on the position information and the position information acquisition time acquired from the user terminal 30 by the receiving unit 11. Specifically, the second search unit 14 acquires the position information (latitude and longitude) of the via point and the stay time based on the history of the position information and the position information acquisition time transmitted from the user terminal 30 at regular intervals or by the user's explicit operation. As the interval of transmission of the position information and the position information acquisition time from the user terminal 30 is shorter, the second search unit 14 can estimate the via point and the stay time of the user more accurately. Note that, however, a means of estimating the via point and the stay time of the user is not limited thereto. For example, the second search unit 14 may acquire the position information registered by the user on a service provided by the Internet and estimate the via point and the stay time of the user based on the position information.

Next, the second search unit 14 acquires the estimated calorie intake. The second search unit 14 searches the store database 23 based on the position information (latitude and longitude) of the via point and acquires the store genre ID of the corresponding store information. After that, the second search unit 14 searches the store genre database 24 based on the store genre ID and the stay time and acquires the estimated calorie intake of the corresponding store genre information.

Finally, the second search unit 14 revises the target calorie consumption upward by the difference between the estimated calorie intake and the amount of calories already consumed by the user and then determines the second route by the above-described automatic re-search.

Figure 10:
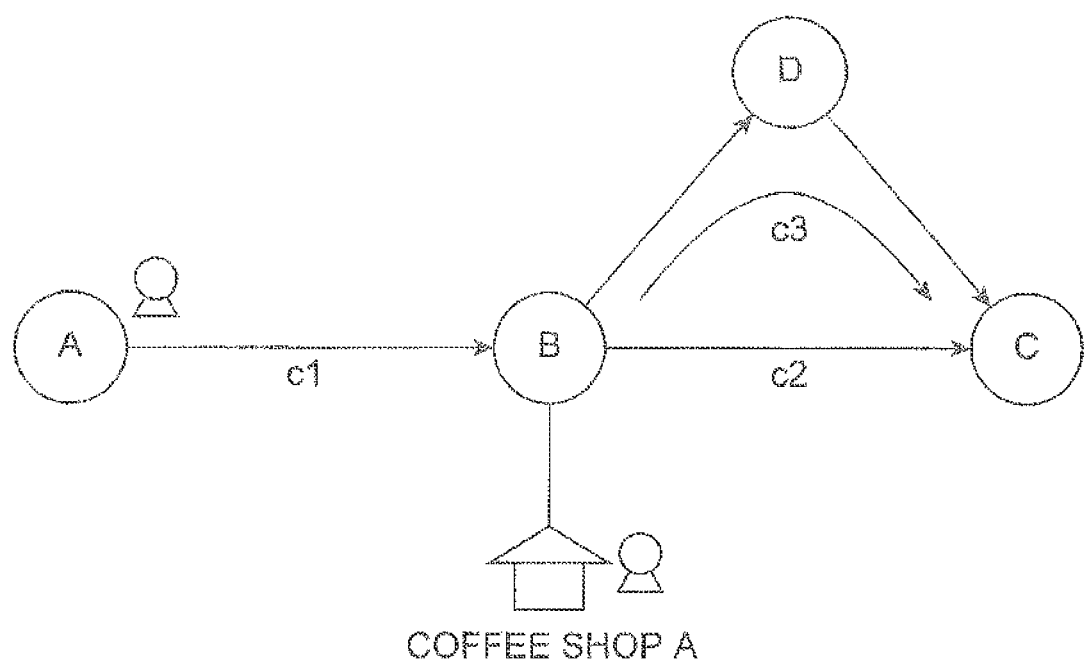
FIG. 10 is a diagram used for explanation of automatic re-search according to this embodiment.

An example of the automatic re-search is described hereinafter with reference to FIGS. 5, 6 and 10. For easier description, the travel time is not taken into consideration (the route requirements are always satisfied) in this example. In FIGS. 10, c1 to c3 indicate the amount of calories to be consumed for traveling through each route. When a user is at the point A and performs route search by setting the place of departure to the point A, the place of destination to the point C, and the target calorie consumption to c0, the second search unit 14 determines that c1+c2≥c0 and selects the route of the point A->the point B->the point C as the second route. However, actually, the user travels through the route of the point A->the point B->the coffee shop A and stays at the coffee shop A for one hour. The processing of the automatic re-search after that is described hereinafter.

First, the second search unit 14 estimates the via point (coffee shop A) and the stay time (one hour) from the position information and the position information acquisition time acquired from the user terminal 30 by the receiving unit 11.

Next, the second search unit 14 searches the store database 23 shown in FIG. 5 based on the via point (coffee shop A) and thereby acquires the store genre ID "J1" of the corresponding store information (store information with the store ID "S1"). After that, the second search unit 14 searches the store genre database 24 shown in FIG. 6 based on the store genre ID "J1" and the stay time "one hour" and thereby acquires the estimated calorie intake "300 kcal" of the corresponding store genre information (store genre information with the store genre ID "J1").

Finally, the second search unit 14 revises the target calorie consumption (c0) upward by the difference (300−c1) between the estimated calorie intake (300 kcal) and the amount of calories (c1) already consumed by the user (c0<-c0+300−c1) and then determines the second route by the automatic re-search. The amount of calories already consumed by the user can be obtained by acquiring the user's travel history (the point A->the point B->the coffee shop A) from the history of the position information and the position information acquisition time acquired from the user terminal 30 by the receiving unit 11. When it is assumed that "c2<c0+300−c1" and "c3≥c0+300−c1" are satisfied, the second search unit 14 determines the route of "the coffee shop A->the point B->the point D->the point C" that satisfies the calorie consumption requirements as the new second route.

The output unit 15 is a functional element that outputs the second route acquired from the second search unit 14 as a search result for the search criteria. To be specific, the output unit 15 transmits information of the second route to the user terminal 30, and the user terminal 30 receives the information and displays a search result screen containing the information of the second route on the display unit 34, and thereby the second route is presented to the user. Note that, when the second route is not found (when the second search unit 14 does not search for the second route or when the second route is not found as a result that the second search unit 14 searches for the second route), the output unit 15 outputs the first route.

The operation of the route search system 1 and a route search method according to this embodiment are described hereinafter with reference to FIGS. 11 to 13.

First, the overall flow of the route search process is described with reference to FIG. 11. Steps S11 to S14 are the process of initial search, and Steps S15 to S18 are the process of automatic re-search.

A user enters search criteria through the input operation unit 31 (Step S11). The route search server 10 receives the search criteria by the receiving unit 11 (Step S12, receiving step). After that, the first search unit 12, the determination unit 13, the second search unit 14 and the output unit 15 perform route search processing (Step S13). The display unit 34 displays the search result acquired from the output unit 15 (Step S14).

The user terminal 30 transmits the position information of the terminal to the route search server 10 still after obtaining the route information once from the route search server 10 at regular intervals or by the user's explicit operation (Step S15). The route search server 10 acquires the position information by the receiving unit 11 and updates the search criteria (Step S16). After that, the first search unit 12, the determination unit 13, the second search unit 14 and the output unit 15 perform the same route search processing as in Step S13 (Step S17), and the display unit 34 displays the search result (Step S18). The automatic re-search from Step S15 to S18 is performed repeatedly at regular intervals or by the user's explicit operation until the user arrives at the place of destination (Step S19).

Figure 11:
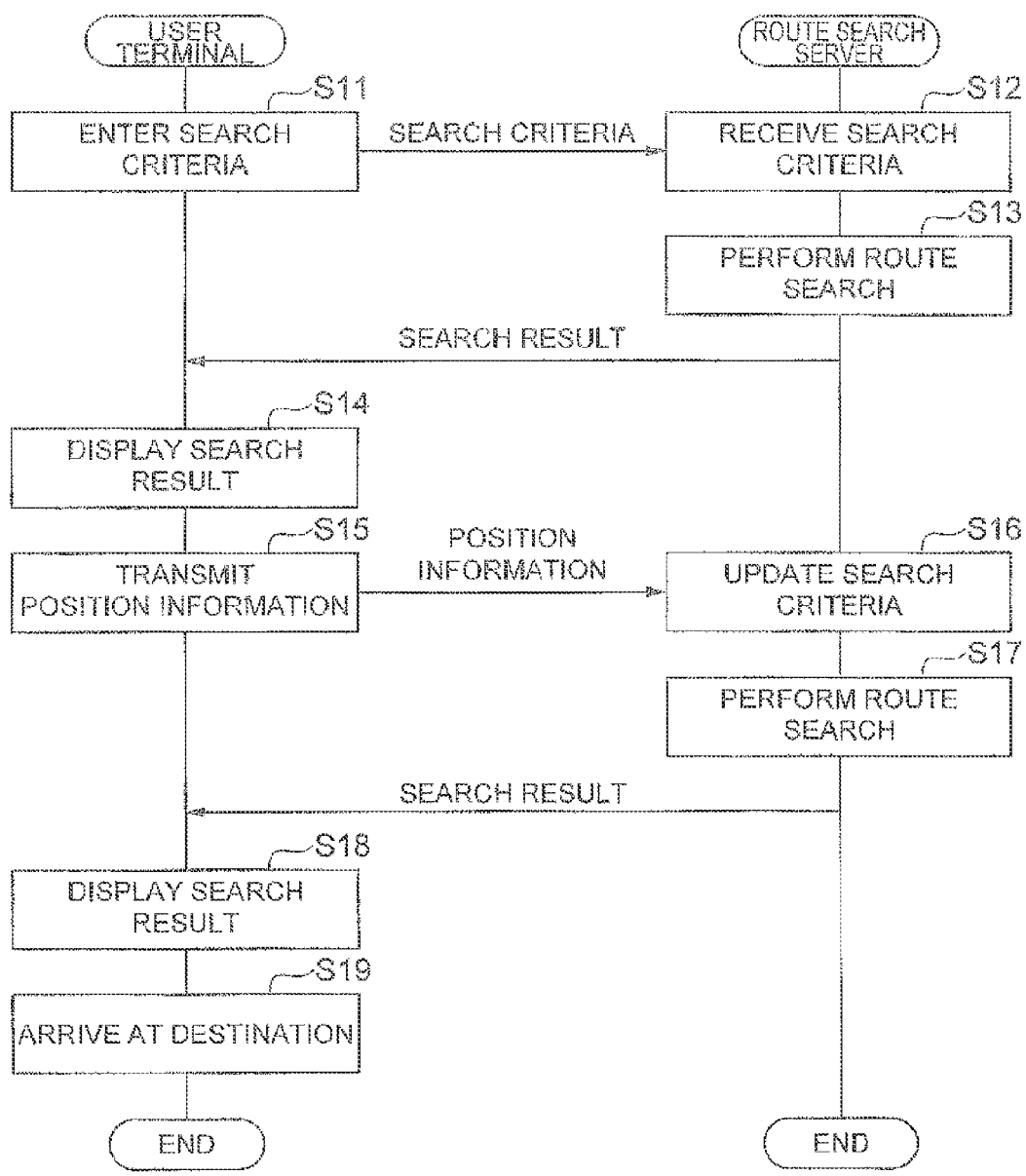
FIG. 11 is a sequence chart showing an operation of the route search system shown in FIG. 1.

The details of the route search processing in Steps S13 and S17 in FIG. 11 are described hereinafter with reference to FIGS. 12 and 13.

Figure 12:
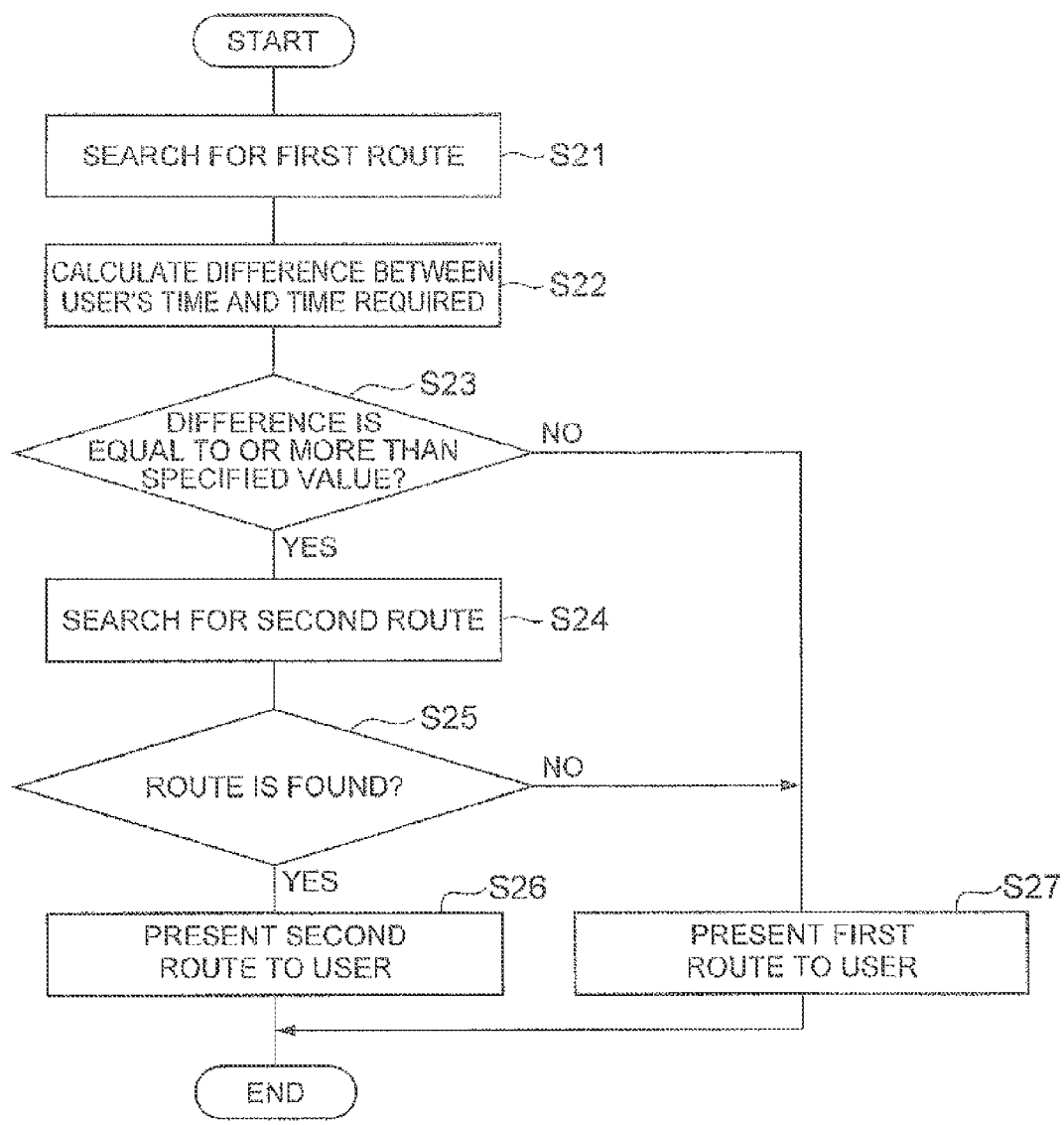
FIG. 12 is a flowchart showing an operation of the route search system shown in FIG. 1.

In the case where the automatic update of target calorie consumption is not performed, the processing of Steps S13 and S17 in FIG. 11 is both the process shown in FIG. 12. Specifically, the first search unit 12 searches for the first route first (Step S21, first search step). Next, the determination unit 13 calculates a difference between the user's time and time required for the first route (Step S22) and determines whether the difference is equal to or more than the specified value (Step S23, determination step).

When the difference is equal to or more than the specified value, the second search unit 14 searches for the second route (Step S24, second search step). When the search criteria do not include target calorie consumption, the second search unit 14 searches for the route that satisfies the route requirements, and when the search criteria include target calorie consumption, the second search unit 14 searches for the route that satisfies both of the route requirements and the calorie consumption requirements. When the second route is found as a result of the search (YES in Step S25), the output unit 15 outputs the second route as a search result (Step S26, output step). On the other hand, when it is determined that the difference is not equal to or more than the specified value (NO in Step S23) or when the second route is not found (NO in Step S25), the output unit 15 outputs the first route (Step S27, output step).

Figure 13:
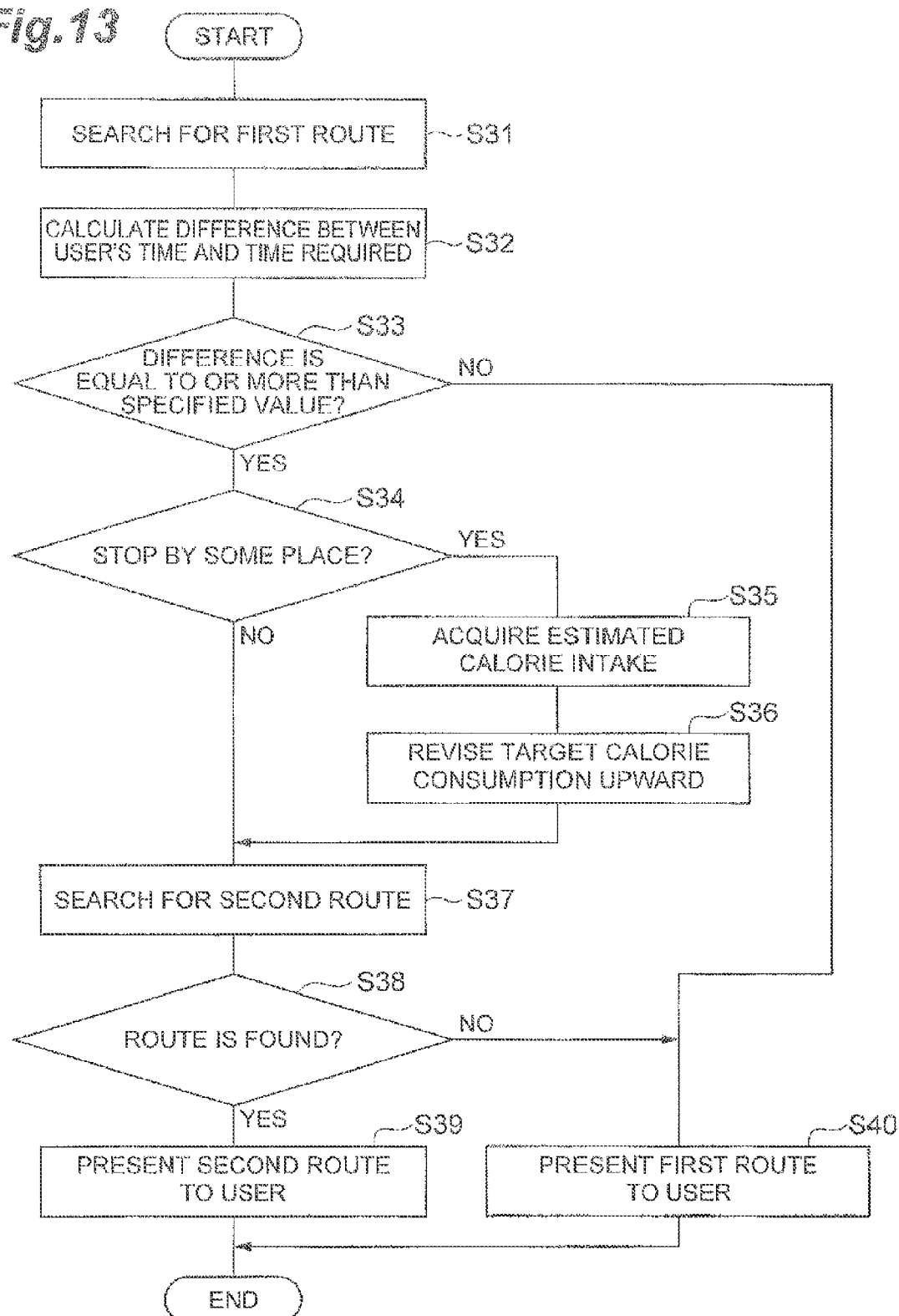
FIG. 13 is a flowchart showing an operation of the route search system shown in FIG. 1.

In the case where the automatic update of target calorie consumption is performed, the processing of Step S13 in FIG. 11 is the process shown in FIG. 12, and the processing of Step S17 in FIG. 11 is the process shown in FIG. 13.

Differences (Steps S34 to S36, second search step) of the process shown in FIG. 13 from the process shown in FIG. 12 are particularly described hereinafter.

The processing of Steps S31 to S33 is the same as the processing of Steps S21 to S23 described above. When the difference is equal to or more than the specified value (YES in Step S33), the second search unit 14 determines whether the user has stopped by a restaurant or the like based on the position information acquired from the user terminal 30 (Step S34). When it is determined that the user has stopped by some place (YES in Step S34), the second search unit 14 acquires the estimated calorie intake based on the estimated via point and stay time (Step S35) and revises the target calorie consumption upward based on the estimated calorie intake (Step S36). After that, the second search unit 14 searches for the second route based on the revised target calorie consumption (Step S37, second search step). The processing of Steps S38 to S40 is the same as the processing of Steps S25 to S27 described above.

Figure 14:
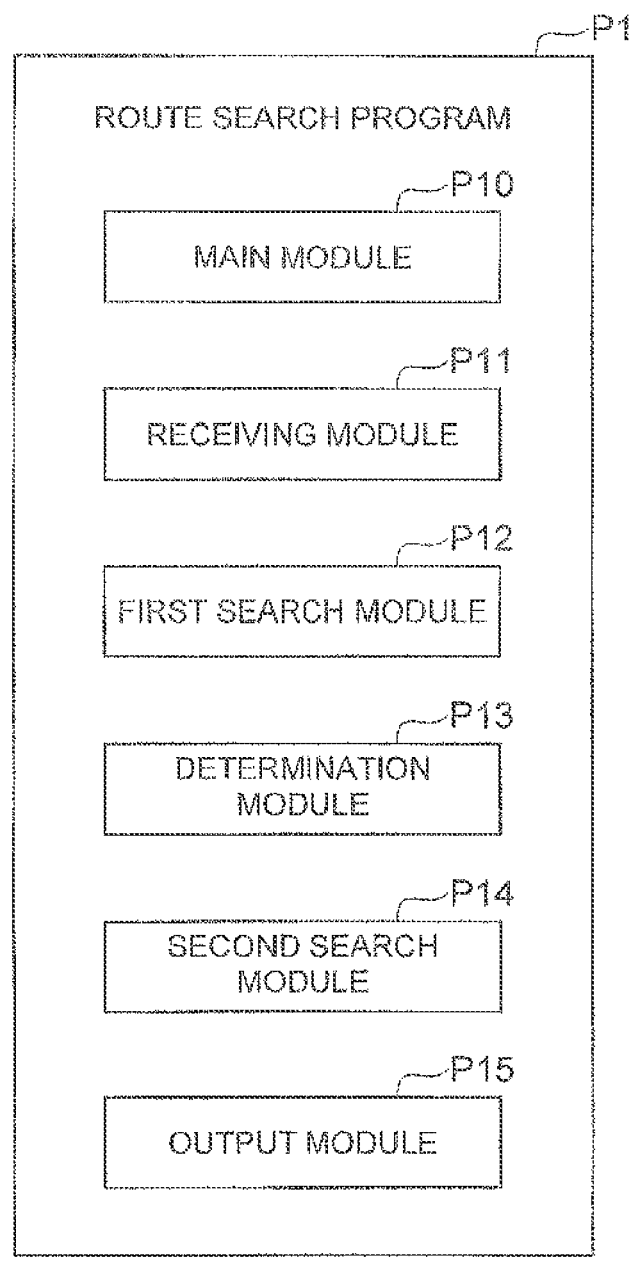
FIG. 14 is a diagram showing a configuration of a route search program according to this embodiment.

A route search program P1 that causes a computer to function as the route search server 10 is described hereinafter with reference to FIG. 14.

The route search program P1 includes a main module P10, a receiving module P11, a first search module P12, a determination module P13, a second search module P14, and an output module P15.

The main module P10 is a part that exercises control over the route search process. The functions implemented by executing the receiving module P11, the first search module P12, the determination module P13, the second search module P14 and the output module P15 are equal to the functions of the receiving unit 11, the first search unit 12, the determination unit 13, the second search unit 14 and the output unit 15 described above, respectively.

The route search program P1 is provided in the form of being recorded in a static manner on a tangible recording medium such as CD-ROM or DVD-ROM or semiconductor memory, for example. Further, the route search program P1 may be provided as a data signal superimposed onto a carrier wave through a communication network.

As described above, according to this embodiment, it is possible to present a user having extra time a route that makes the best use of that time, which is a route that allows the user to make effective use of the time during traveling. Further, in the case where the already presented route becomes inappropriate later on, it is possible to present the user an appropriate route again by automatic route re-search. Furthermore, by adding target calorie consumption to search criteria, it is possible to present the user a route to achieve consumption of target calories. Further, in the case where the user stops by a restaurant or the like, it is possible to automatically revise the target calorie consumption upward and present the user a route to achieve consumption of the initially set target calories.

Hereinbefore, the present invention has been described in detail with respect to the embodiment thereof. However, the present invention is not limited to the above-described embodiment. Various changes and modifications may be made therein without departing from the scope of the invention.

All of the functional elements of the route search server 10 in the above-described embodiment may be incorporated into the user terminal 30, and the user terminal 30 may directly access the databases 20 and obtain the second route. In this case, the route search server 10 is omitted. To be specific, as shown in FIG. 15, the receiving unit 11 receives input information from the input operation unit 31 and the assistance information storage unit 33 and generates search criteria, and outputs the search criteria to the first search unit 12.

Further, the route search system according to the present invention may be implemented as API (Application Programming Interface) that returns information about a route that makes the best use of user's time in response to a search request from another computer software.

REFERENCE SIGNS LIST

1 . . . route search system, 10 . . . route search server, 11 . . . receiving unit, 12 . . . first search unit, 13 . . . determination unit, 14 . . . second search unit, 15 . . . output unit, 20 . . . databases (storage unit), 21 . . . route database, 22 . . . facility database, 23 . . . store database, 24 . . . store genre database, 30 . . . user terminal, 31 . . . input operation unit, 32 . . . request unit, 33 . . . assistance information storage unit, 34 . . . display unit, P1 . . . route search program, P10 . . . main module, P11 . . . receiving module, P12 . . . first search module, P13 . . . determination module, P14 . . . second search module, P15 . . . output module

The invention claimed is:

1. A route search system comprising:
at least one non-transitory memory operable to store program code;
at least one processor operable to read said program code and operate as instructed by said program code, said program code including:
determining code that causes said at least one processor to determine a current location of a user terminal as a place of departure;
receiving code that causes said at least one processor to receive a planned departure time, a target arrival time, the place of departure, a place of destination and target calorie burn as search criteria;
searching code that causes said at least one processor to search for a route by referring to a memory configured to store route information and search for one or more candidate routes by referring to the memory based on the planned departure time, the target arrival time, the place of departure and the place of destination, acquiring code that causes said at least one processor to acquire expected calorie burn and acquire a corresponding expected calorie intake based on a corresponding store genre ID of store information for a case where a user uses each candidate route, modifying code that causes said at least one processor to modify the target calorie burn based on the expected calorie intake, and selecting code that causes said at least one processor to select the candidate route that satisfies a first condition that a departure time is after the planned departure time, a second condition that an arrival time is before the target arrival time, and a third condition that the expected calorie burn is equal to or more than the target calorie burn corresponding to a presented route; and
outputting code that causes said at least one processor to output the presented route as a search result for the search criteria to the user terminal for visual representation on the user terminal.

2. The route search system according to claim 1, wherein the searching code comprises calculating code that causes said at least one processor to calculate a departure time difference between a departure time of the one or more candidate routes and the planned departure time and calculating code that causes said at least one processor to calculate an arrival time difference between an arrival time of the one or more candidate routes and the target arrival time, and selecting code that causes said at least one processor to select the candidate route that satisfies the first condition that the departure time is after the planned departure time and the departure time difference is equal to or less than a first threshold, the second condition that the arrival time is before the target arrival time and the arrival time difference is equal to or less than a second threshold, and the third condition as the presented route.

3. The route search system according to claim 2, wherein the searching code comprises acquiring code that causes said at least one processor to acquire a reference route from the place of departure to the place of destination with less travel burden and time required for the reference route by referring to the memory based on the place of departure and the place of destination, and when a required time difference between time from the planned departure time to the target arrival time and the time required for the reference route is equal to or more than a reference value, calculating code causes said at least one processor to calculate the departure time difference and the arrival time difference and acquisition of the expected calorie burn, and selection code that causes said at least one processor to select the candidate route that satisfies the first condition, the second condition, the third condition, and a fourth condition that it takes a longer time to travel than the reference route as the presented route.

4. The route search system according to claim 3, wherein the searching code comprises selection code that causes said at least one processor to select the reference route as the presented route without searching for the one or more candidate routes when the required time difference is less than the reference value.

5. The route search system according to claim 1, wherein the memory further stores availability information indicating an available period or an available time zone of a route or a facility, and
the searching code comprises selection code that causes said at least one processor to select the candidate route that satisfies the first condition, the second condition, the third condition, and a fifth condition that it goes through the route or the facility during the available period or the available time zone as the presented route.

6. The route search system according to claim 1, wherein the memory further stores evaluation information indicating an evaluation of a route or a facility based on a timing factor, and
the searching code comprises determining code that causes said at least one processor to determine an evaluation value of the candidate route based on the evaluation information of a route or a facility included in the candidate route, and selection code that causes said at least one processor to select the candidate route that has a higher evaluation value than the other candidate routes as the presented route.

7. The route search system according to claim 1, wherein the receiving code further comprises acquiring code that causes said at least one processor to acquire position information of a user after the outputting code causes said at least one processor to output the presented route, and specifying code that causes said at least one processor to specify new search criteria including the planned departure time and the place of departure obtained from the position information, and the searching code further causes said at least one processor to output a new presented route is output by the searching code, and the outputting code further causes said at least one processor to output the new presented route based on the new search criteria.

8. The route search system according to claim 7, wherein the searching code further causes said at least one processor to select the new presented route among a plurality of routes that go through a different via point from the presented route previously output.

9. The route search system according to claim 7, wherein the searching code further causes said at least one processor to select the new presented route among routes that travel by a different means of transportation from the presented route previously output.

10. The route search system according to claim 1, wherein the searching code further causes said at least one processor to, when the candidate route where the expected calorie burn is equal to or more than the target calorie burn does not exist, select the candidate route that satisfies the first condition and the second condition, and where the expected calorie burn is highest as the presented route.

11. The route search system according to claim 1, wherein the searching code further causes said at least one processor to acquire position information of a user after the outputting code outputs the presented route, estimate a via point and a stay time at the via point of the user based on the position information, calculate calorie intake of the user at the via point based on a result of the estimation, update the target calorie burn based on the calorie intake, and search for the new presented route based on the search criteria including the updated target calorie burn.

12. A route search method performed by a route search system, comprising:
determining a current location of a user terminal as a place of departure;
receiving a planned departure time, a target arrival time, the place of departure, a place of destination and target calorie burn as search criteria;
searching for a route by referring to a memory that stores route information, the searching including: searching for one or more candidate routes by referring to the memory based on the planned departure time, the target arrival time, the place of departure and the place of destination, acquiring expected calorie burn and an expected calorie intake based on a store genre ID of store information for a case where a user uses each candidate route, modifying the target calorie burn based on the expected calorie intake, and selecting the candidate route that satisfies a first condition that a departure time is after the planned departure time, a second condition that an arrival time is before the target arrival time, and a third condition that the expected calorie burn is equal to or more than the target calorie burn corresponding to a presented route; and
outputting the presented route as a search result for the search criteria to the user terminal for visual representation on the user terminal.

13. A route search system comprising:
at least one non-transitory memory operable to store program code;
at least one processor operable to read said program code and operate as instructed by said program code, said program code including:

determining code that causes said at least one processor to determine a current location of a user terminal as a place of departure;

receiving code that causes said at least one processor to receive search criteria including a planned departure time, a target arrival time, the place of departure, a place of destination and a target calorie burn;

acquiring code that causes said at least one processor to acquire a first route from the place of departure to the place of destination and time required for the first route found based on the search criteria by referring to a memory configured to store route information, and when a difference between time from the planned departure time to the target arrival time and the time required is equal to or more than a specified value, calculate a difference between a departure time of a candidate route and the planned departure time and calculate a difference between an arrival time of the candidate route and the target arrival time by referring to the memory, acquire an expected calorie burn and an expected calorie intake based on a store genre ID of store information corresponding to the candidate route, determine whether the candidate route satisfies route requirements that depart from the place of departure within a specified time from the planned departure time, arrive at the place of destination at some time from a specified time before the target arrival time to the target arrival time by taking a longer time to travel than the first route based on the two differences, the expected calorie intake corresponding to the candidate route and the target calorie burn, and thereby search for a second route that satisfies the route requirements; and outputting code that causes said at least one processor to output the second route as a search result for the search criteria to the user terminal for visual representation on the user terminal.

14. A route search method performed by a route search system, comprising:

determining a current location of a user terminal as a place of departure;

receiving search criteria including a planned departure time, a target arrival time, the place of departure and a place of destination;

acquiring a first route from the place of departure to the place of destination and time required for the first route found based on the search criteria by referring to a memory configured to store route information, and when a difference between time from the planned departure time to the target arrival time and the time required is equal to or more than a specified value, calculating a difference between a departure time of a candidate route and the planned departure time and calculating a difference between an arrival time of the candidate route and the target arrival time by referring to the memory, acquiring an expected calorie burn and an expected calorie intake based on a store genre ID of store information corresponding to the candidate route, determining whether the candidate route satisfies route requirements that depart from the place of departure within a specified time from the planned departure time and arrive at the place of destination at some time from a specified time before the target arrival time to the target arrival time by taking a longer time to travel than the first route based on the two differences, the expected calorie intake corresponding to the candidate route and the target calorie burn, and thereby searching for a second route that satisfies the route requirements; and outputting the second route as a search result for the search criteria to the user terminal for visual representation on the user terminal.

* * * * *